United States Patent [19]

Jones et al.

[11] Patent Number: 5,546,436
[45] Date of Patent: Aug. 13, 1996

[54] TRANSPORTATION AND STORAGE CASK FOR SPENT NUCLEAR FUELS

[75] Inventors: Kyle B. Jones, San Jose; Robert A. Lehnert, Milpitas; Ian D. McInnes, San Jose; Robert D. Quinn, Morgan Hill; Steven E. Sisley, Fremont, all of Calif.; Charles J. Temus, Puyallup, Wash.

[73] Assignee: Pacific Nuclear Systems, Inc., Federal Way, Wash.

[21] Appl. No.: 419,120

[22] Filed: Apr. 10, 1995

Related U.S. Application Data

[62] Division of Ser. No. 131,973, Oct. 8, 1993, Pat. No. 5,406,600.

[51] Int. Cl.⁶ .................................................. G21F 5/008
[52] U.S. Cl. ................................................... 376/272
[58] Field of Search ....................... 376/272; 250/506.1, 250/507.1

[56] References Cited

U.S. PATENT DOCUMENTS

| | | | |
|---|---|---|---|
| 3,119,933 | 1/1964 | Allen | 376/272 |
| 4,310,034 | 1/1982 | Guilloteau et al. | 376/272 |
| 4,666,659 | 5/1987 | Lusk et al. | 376/272 |
| 4,983,352 | 1/1971 | Efferding | 376/272 |

*Primary Examiner*—Daniel D. Wasil
*Attorney, Agent, or Firm*—Christensen, O'Connor Johnson & Kindness PLLC

[57] ABSTRACT

The present invention provides a cask (10) for transport and short-term storage of spent nuclear fuel. The cask 10 includes a structural shell (14) defining a cavity (40) for receiving spent nuclear fuel. The shell is formed from an upper shell portion (16) formed of a first metal and a lower shell portion (18) formed from a second metal. The first metal utilized to form the upper shell portion has a higher load bearing strength than the second metal utilized to form the lower shell portion. A bearing surface is defined on the upper shell portion by trunnions (30) mounted within sleeves (32) secured to the upper shell portion. The trunnions (30) each define a bearing projection (160) that is engageable to enable hoisting of the cask, with the tensile and shear loads of hoisting the cask being transferred from the trunnions to the trunnion mounting sleeves, and thus to the upper shell portion of the structural shell. The cask further includes a bottom closure plate (20) secured to the bottom end of the shell, and a top closure plate releasably securable to the top end of the shell. A neutron radiation absorbing shield jacket (28) is formed about the exterior of the structural shell.

4 Claims, 14 Drawing Sheets

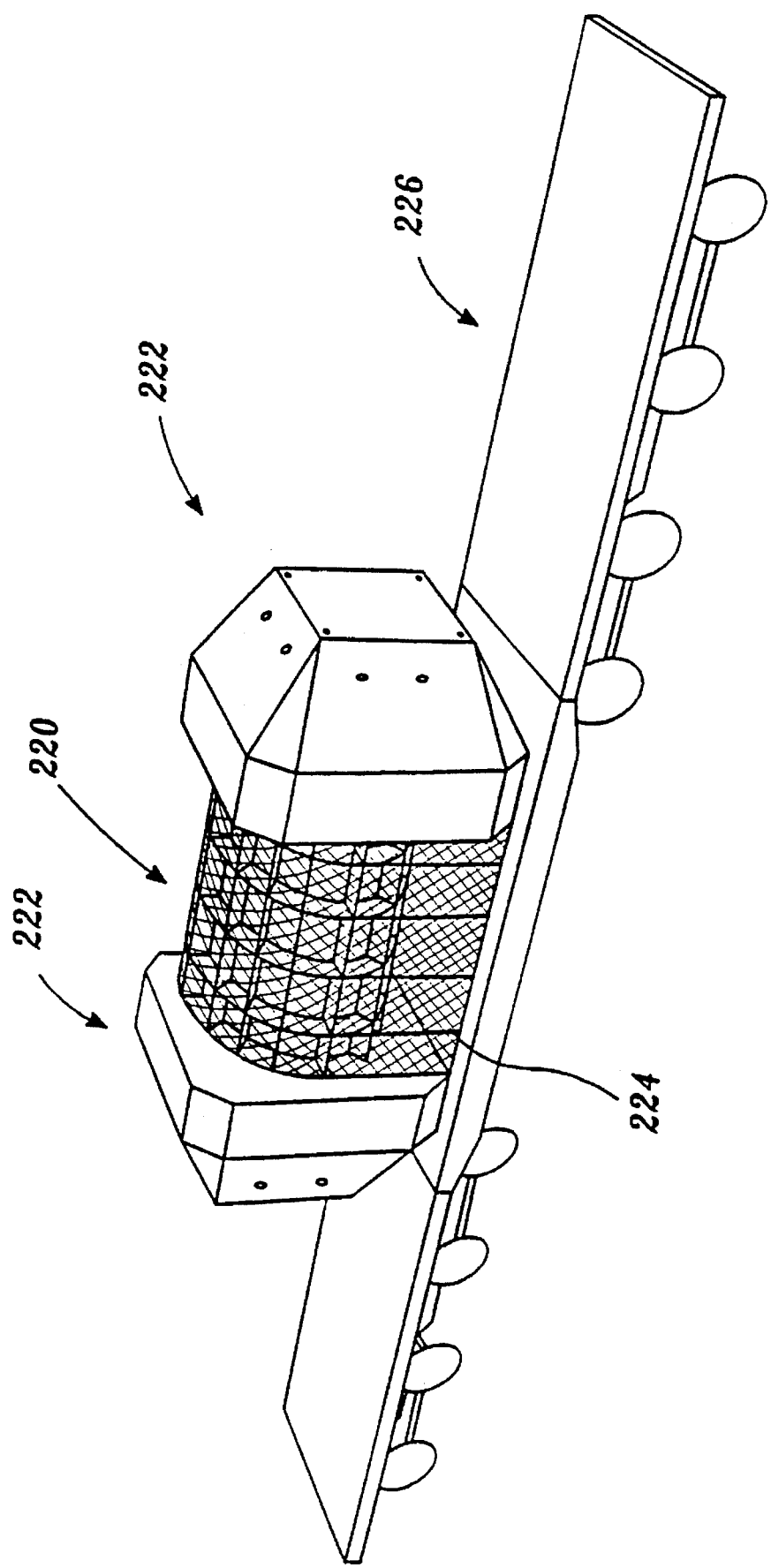

TRANSPORTATION AND STORAGE CASK FOR SPENT NUCLEAR FUELS

This is a divisional of the prior application Ser. No. 08/131,973, filed on Oct. 8, 1993, of Kyle B. Jones, Robert E. Lehnert, Ian D. McInnes, Robert D. Quinn, Steven E. Sisley, and Charles J. Temus for TRANSPORTATION AND STORAGE CASK FOR SPENT NUCLEAR FUEL, now U.S. Pat. No. 5,406,600, the benefit of the filing date of which are hereby claimed under 35 U.S.C. § 120.

TECHNICAL FIELD OF THE INVENTION

The present invention relates to containers used for transportation and short term storage of spent nuclear fuel.

BACKGROUND OF THE INVENTION

As the nuclear utility industry matures, there is an ever-increasing need for additional storage space to safely contain spent nuclear fuel. One method that has been developed in recent years for storage of spent nuclear fuels is dry storage in horizontal storage modules, which are shielded bunkers in which containerized spent fuel is stored and monitored for definite periods of time. One conventional technique for horizontal modular dry storage of spent nuclear fuel rods is disclosed in U.S. Pat. No. 4,780,269 to Fischer et al.

A basic procedure for dry storage of spent nuclear fuel is to position a dry shielded canister into a shielded transfer cask. The canister and cask are filled with deionized water, which is then lowered into a pool containing the spent nuclear fuel. Spent fuel assemblies are then placed into the canister, and a shielded end plug is positioned to close the canister. The canister and cask are then removed from the pool, and the cask and canister are drained and dried. The exterior of the cask is decontaminated, followed by closure of the cask with a closure plate. The closed transportation cask is then lowered onto a transport trailer and secured by tie-downs.

The transport trailer carries the cask to the sight of the horizontal dry storage modules. The cask is opened and docked with an entry port of a dry storage module. The canister is then transferred from the cask into the module, such as by passing a ram through the dry storage module from an end opposite the entry port, through the entry port and into the opened cask. The canister can then be grasped and pulled into the dry storage module, after which both the entry port and access port are sealed.

A critical aspect of this process is the safe containment and transfer of the spent nuclear fuel within the canister from the original pool storage to the final dry horizontal storage site. The transport cask must be constructed with adequate structural strength and shielding to both physically protect the dry shielded canister within, and to provide biological shielding to minimize personnel radiation dosages during canister transfer and transport operations.

During the canister transfer and transport process, the cask must be able to withstand any foreseeable impact, such as could occur by accidental dropping of the cask from the transport trailer or exposure to tornadoes or other natural disasters. In the United States, federal regulations setting forth requirements that transport casks must meet are found in 10 C.F.R. 72, including subpart G, as well as 10 C.F.R. 71 and 10 C.F.R. 50. In particular, the cask must be able to withstand impacts due to a drop of 30' onto an essentially, unyielding flat horizontal surface, without structural failure. Even if structurally damaged, no leakage of the contents from the cask is permitted.

It is thus important to design casks with high structural integrity. At the same time, it is desirable to maximize the quantity of spent fuel that can be transported within the cask at any given time, and to minimize the cost of constructing the cask. While strength considerations typically warrant constructing the cask from thicker sections of metal and other materials, this requirement may reduce the quantity of spent fuel that can be transported within the cask. External dimensions of the cask are limited by constraints such as the total weight of the loaded cask, and clearances required to transport the casks through tunnels, under bridges and overpasses, and the like.

Currently, conventional casks are often constructed from a polished austentitic stainless steel, such as 304 stainless steel, for corrosion prevention. However, such stainless steel is limited in strength and may fail under high stresses. To combat this potential, conventional casks are constructed from thick metal sections, and must be reinforced with gusset plates and other reinforcing members. Additionally, locations on the casks that are subjected to force during transport must be reinforced with additional metal plates welded to the cask structure.

For example, conventional casks are outfitted with cylindrical trunnions welded or bolted directly to a cylindrical structural shell of the cask at diametrically opposed locations. These trunnions are grasped by hooks, and serve as pivot points while lifting the cask during the transportation process. Because of the stresses transferred to the cask structure from the trunnions during use, the shell is typically reinforced in the area surrounding the trunnions by welding additional plates of metal.

The trunnions themselves are conventionally permanently secured to the structural shell of casks by welding or bolting directly to the shell. In the case of welding, the welded joint is subjected to substantial stress during hoisting of the cask. In the case of bolting the trunnions in place, the bolts are subjected to extreme shear and tensile loads during hoisting of the cask. Again, the trunnions must be heavily reinforced to withstand such loads, increasing the weight and overall dimensions of the cask, and thus decreasing the spent fuel containment capacity and increasing the cost of manufacture.

When sealed joints, such as elastomeric (e.g., O-ring) seals or metal seals are utilized, the base metal used to form the structural shell is conventionally machined to form the sealing surfaces. Thus, for example, when 304 stainless steel is used to construct the shell, annular surfaces on the shell are machined and polished to form sealing surfaces. While functioning adequately in most situations, extreme impact to the seal area, such as by accidental dropping of the cask at an oblique angle whereby force is concentrated on the seal area, may result in permanent deformation of the metal seal surface, and subsequent leakage potential.

SUMMARY OF THE INVENTION

The present invention provides a container designed for use as a cask for short-term containment and transporting of spent nuclear fuel. In the first aspect of the present invention, the container is formed from a structural shell defining a cavity for receiving spent nuclear fuel, and first and second end apertures opening into the cavity. The shell has a first end portion formed of a first material and a second end portion formed of a second material. The first end portion is joined to the second end portion to form the structural shell. A bearing surface is defined on the first end portion of the shell and is engageable to enable hoisting of the container. The first end portion of the shell is constructed from a first material that has a higher load bearing strength than the second material, to handle the hoisting stress. The container also includes a first closure securable to the first end portion of the shell to seal the first end aperture, and a second closure securable to the second end portion of the shell to seal the second end aperture. The container further includes a radiation absorbing shield layer, which may include both gamma radiation and a neutron radiation absorbing materials.

The container is thus constructed so that those areas of the container that are subjected to the greatest stress, e.g. the first end portion, is constructed from the strongest material, such as a high-strength metal alloy. However, those portions of the cask that are not exposed to as high a stress are produced from lower cost materials having a strength that is adequate for the lower loads to be imposed on those portions.

In a further aspect of the present invention, a cask is provided that includes a tubular inner shell defining a cavity for receiving spent nuclear fuel, and first and second ends. A tubular outer shell having first and second ends is assembled coaxially over the inner shell to define an annular space therebetween. A radiation absorbing material fills the annular space. An annular member defining a central aperture and a first annular sealing surface is secured about its perimeter to the first ends of the inner shell and the outer shell to create airtight joints with both the inner shell and the outer shell. A first closure plate is releasably securable to the annular member and defines a second annular sealing surface corresponding to the first annular sealing surface defined by the annular member. A seal is positioned between the second annular sealing surface of the first closure plate and the first annular sealing surface of the annular member to create an airtight seal between the first closure plate and the annular member. The cask also includes a second closure plate secured proximate its perimeter to the second ends of the inner shell to create airtight joints with the inner shell.

In a further aspect of the present invention, a cask is provided that includes a structural shell defining a cavity for receiving spent nuclear fuel and first and second end apertures. A first closure is securable to the shell to seal the first end aperture. A second closure is securable to the shell to seal the second end aperture. A radiation absorbing shield layer is affixed to the shell. First and second pairs of trunnion mounting structures, preferably configured as tubular sleeves are secured in opposing disposition within apertures formed in the structural shell. First and second trunnions, each defining a base and a bearing surface, are included. The base of each trunnion is releasably securable to a corresponding one of the trunnion mounting structures, whereby the bearing surfaces of the first trunnions can be grasped to hoist the container. The second trunnions are used to provide a point of support and rotation for loading and unloading the cask from its conveyance.

In a preferred embodiment, the trunnion mounting structures are configured as annular sleeves that are welded to the structural shell of the cask, within which sleeves the base of the trunnions are received. Because of this construction, fasteners such as bolts used to secure the trunnions to the mounting structures are substantially isolated from tensile and shear loads.

In a further aspect of the present invention, the trunnion mounting structures are preferably formed from a high-strength material such as is used to form the portion of the outer shell to which the first trunnions are mounted, thereby providing a strong trunnion mounting without requiting additional plate reinforcement.

In a still further aspect of the present invention, improved seal joints are included in the cask. Sealing surfaces of the cask are formed utilizing hardened metal weld overlays, thereby providing sealing surfaces that are not readily subject to permanent deformation upon impact of the cask. In the preferred embodiment, sealing surfaces of closure plates on the cask include grooves formed to define a half-dovetailed cross section for receiving seals. This enables use of either metal or elastomeric seals in the joints, and enables assembly of the joints while the cask is in either the horizontal or vertical disposition.

In a still further aspect of the present invention, a cask is disclosed that includes a tubular structural shell defining a cavity for receiving spent nuclear fuel and first and second opened ends. The first closure plate is releasably securable to the first opened end of the shell, whereby when secured to the shell, the first opened end of the shell is sealed, and when released from the shell, loading and unloading of spent nuclear fuel through the first open end into the cavity is permitted. The second closure plate is secured to and seals the second open end of the shell. The second closure plate defines a central access aperture. An access cover plate is releasably securable to the second closure plate to seal the central access aperture. When released from the second closure plate, entry of a ram through the access aperture into the cavity of the shell to facilitate unloading of spent nuclear fuel through the first open end of the shell is permitted.

Shield plugs filled with a radiation-absorbing material are provided to cover the trunnion mounting structures and central access aperture formed in the cask during short-term storage and transportation.

In another aspect, the present invention relates to a skid for transporting a nuclear fuel transportation cask and containment vessel. The skid supports the cask around the neutron radiation shielding material. The skid includes a supporting member and a retaining member that each include a plurality of parallel spaced-apart plates lying in planes perpendicular to a longitudinal axis of the cask which are connected by a plurality of longitudinal fins parallel to the longitudinal axis of the cask. The longitudinal fins are positioned to mate with structural elements associated with the neutron radiation shielding material to transfer loads from the cask to the skid.

The present invention thus provides a cask that is less costly to construct, yet that provides improved safety under impact conditions. Exposure of workers to radiation during transport procedures is also reduced.

BRIEF DESCRIPTION OF THE DRAWINGS

The present invention and its attendant advantages will be more readily understood in view of the following description, when read in conjunction with the accompanying drawings, in which:

FIG. 12 is an environmental view of a transportation cask protected by impact limiters and carried by a skid formed in accordance with the present invention resting on a conventional trailer;

DETAILED DESCRIPTION OF THE PREFERRED EMBODIMENT

Figure 1:
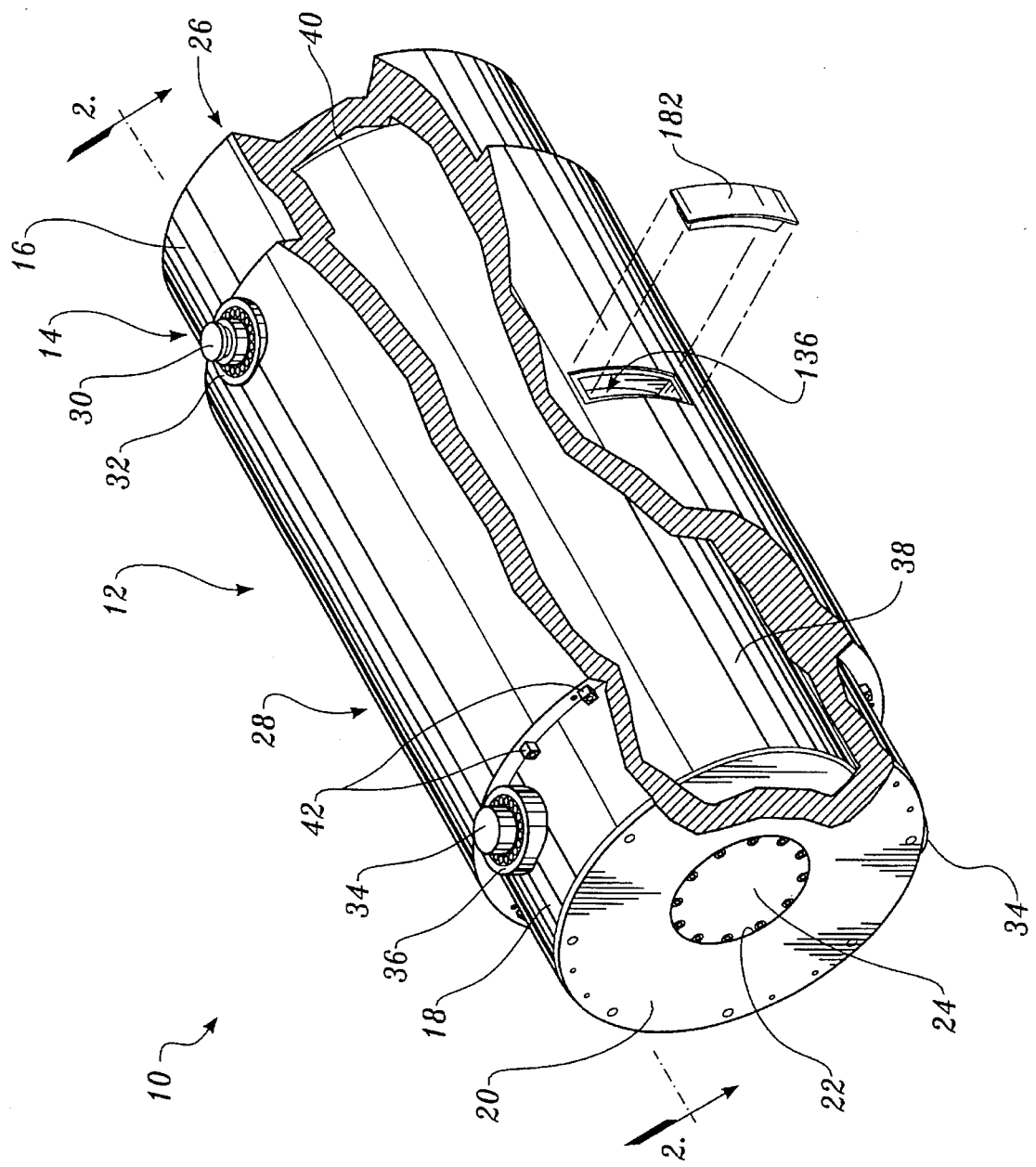
FIG. 1 provides an isometric view of a cask constructed in accordance with the present invention, with a portion of the cask cut away to show a dry shielded canister for containment of spent nuclear fuel installed therewithin, and with a shield plug for a tie-down key way shown exploded from the cask.

A preferred embodiment of a cask 10 for transportation and short-term storage of spent nuclear fuel is shown in FIG. 1. The cask 10 includes a body 12 constructed from a tubular structural shell 14 having an upper shell portion 16 and a lower shell portion 18. The lower shell portion 18 is sealed by a bottom closure plate 20 that has a central access aperture 22 that is sealed with an access cover plate 24. The upper shell portion 16 is sealed with a top closure plate 26. The exterior of the structural shell 14 is shielded with a neutron absorbing shield jacket 28. Two diametrically opposed upper trunnions 30 (only one shown) are secured within upper trunnion mounting sleeves 32 to the exterior of the upper shell portion 16. Two lower trunnions 34 are secured in diametric opposition to the lower shell portion 18 within lower trunnion mounting sleeves 36.

As used herein throughout, "bottom" and "lower" refer to the end of the cask 10 and its components closest in proximity to the bottom closure plate 20, while the words "top" and "upper" refer to the opposite end proximate the top closure plate 26. A dry storage canister 38 for spent nuclear fuel is shown installed within the interior cavity 40 of the cask 10. The construction of the dry storage canister 38 is fully described in a U.S. patent application filed on Oct. 8, 1993, in the name of inventors R. A. Lehnert, R. D. Quinn, S. E. Sisley, and B. D. Thomas, entitled CONTAINERS FOR TRANSPORTATION AND STORAGE OF SPENT NUCLEAR FUEL, the disclosure of which is hereby expressly incorporated by reference.

A plurality of lugs 42 are secured to the structural shell 14 and to the annular ends of the shield jacket 28 about the circumference of the cask 10, on both the lower and upper (not shown) ends of the shield jacket 28. The purpose of the lugs 42 is to enable mating of the cask 10 with impact limiters during transport. Impact limiters and transportation skids suitable for use in transporting the cask 10 are fully disclosed in a United States patent application filed on Oct. 8, 1993 in the name of inventors R. A. Johnson, I. D. McInnes, R. D. Quinn, and C. J. Temus, entitled IMPACT LIMITER FOR SPENT NUCLEAR FUEL TRANSPORTATION CASK, the disclosure of which is hereby expressly incorporated by reference.

Figure 2:
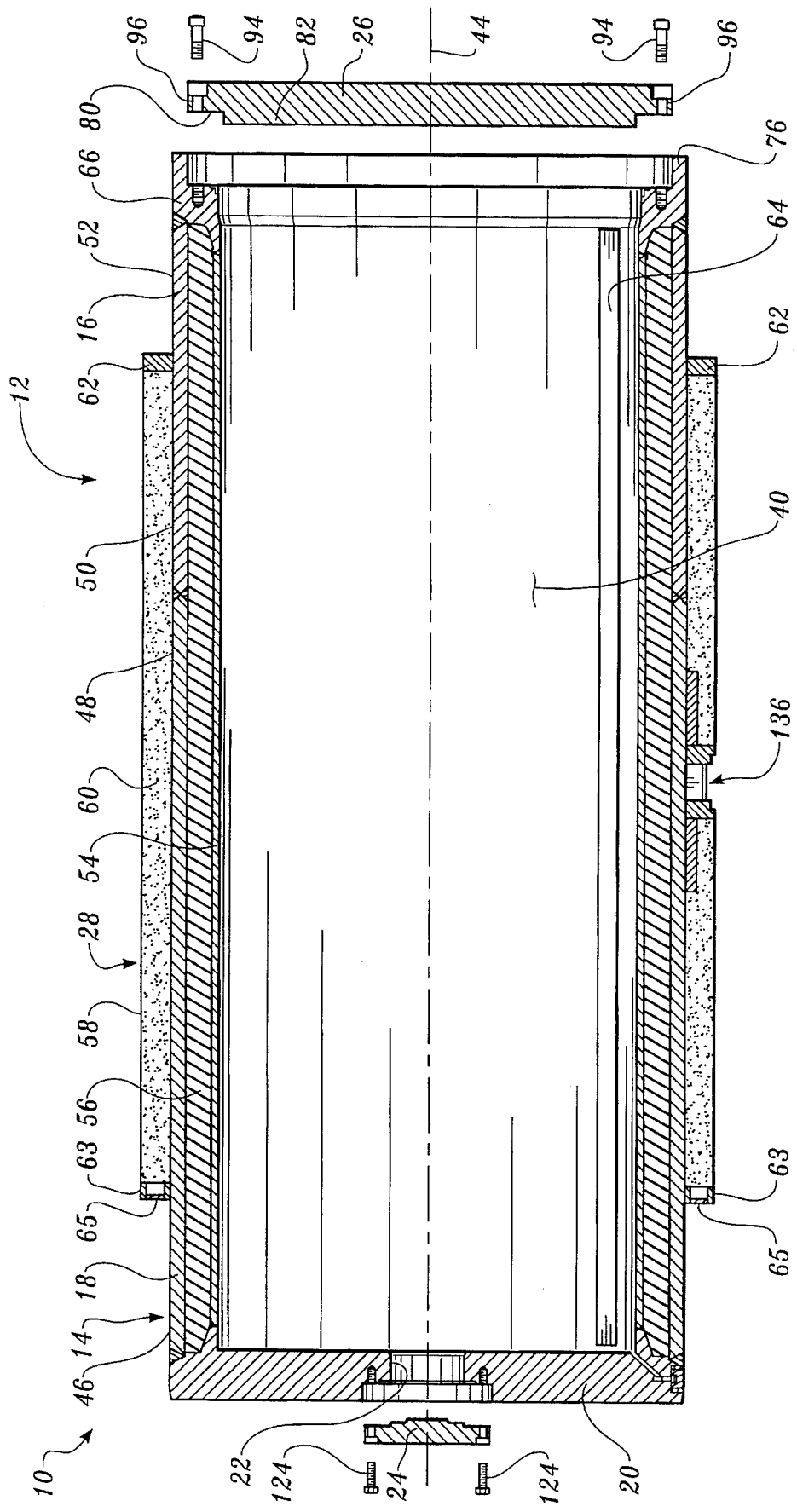
FIG. 2 provides a cross-sectional view of the cask of FIG. 1, excluding the internal dry shielded canister, taken along a plane intersecting the longitudinal axis of the cask as indicated by line 2—2 in FIG. 1, with an access aperture closure plate and top closure plate shown exploded from the cask.

Referring now to FIG. 2, the construction of the body 12 shall be described. The body 12 has an overall cylindrical configuration and includes the structural shell 14. The structural shell 14 has a tubular configuration and defines a central longitudinal axis 44 that is aligned with the central longitudinal axes of the other annular components of the body 12, as shall be described. The lower shell portion 18 of the structural shell 14 also has a tubular configuration, defining a circumferential bottom edge 46 and a circumferential top edge 48. The length of the lower shell portion 18 is approximately two-thirds the length of the structural shell 14. The upper shell portion 16 extends the remaining one-third of the length, and defines a circumferential lower edge 50 and a circumferential top edge 52. The upper edge 48 of the lower shell portion 18 abuts and is welded to the lower edge 50 of the upper shell portion 16, using a full penetration weld around the entire circumference of the structural shell 14. The upper shell portion 16 and lower shell portion 18 each have a central axis that is aligned with the longitudinal axis 44, and cooperatively define a right cylinder.

The lower shell portion 18 is formed from a rigid material, preferably a corrosion resistant metal, and most preferably a stainless steel, such as ASME SA-240 type 304 austentitic stainless steel. However, the upper shell portion 16 is preferably formed from a material having a higher load bearing strength, also preferably a stainless steel, such as ASME SA-240 type XM-19 high alloy stainless steel. Type XM 19 stainless steel is also austenitic, but has approximately twice the load bearing strength of type 304.

As shown in FIG. 1, the upper trunnions 30 are secured to the upper shell portion 16. The upper trunnions 30 are intended to be used for hoisting and lifting the cask 10, both when empty and when loaded with a full canister 38. Thus, the upper trunnions 30 in use transmit significant shear and tensile loads to the upper shell portion 16. The lower shell portion 18 carries the lower trunnions 34, which are used to upright and stabilize the cask 10 during transport, as shall be described subsequently, and thus are subjected to lower loading. Because type XM-19 stainless steel is more costly than type 304 stainless steel, the cost of manufacture is reduced by utilizing the XM-19 for the load beating portions of the cask 10. Both portions of the structural shell 14 can be formed and welded from rolled plate.

Referring to FIG. 2, coaxially installed within the structural shell 14 is an inner shell 54, which also may be formed from type 304 stainless steel or other suitable corrosion resistant structural materials. The inner shell 54 is slightly smaller in external diameter than the interior of the structural shell 14, and thus defines an annular space therebetween. This annular space is filled with a gamma radiation absorbing material 56, such as ASTM B-29 chemical lead. The steel contained in the structural shell 14 and the inner shell 54, as well as the bottom closure plate 20 and top closure plate 26, also serve to absorb gamma radiation.

The shield jacket 28 has a tubular configuration and is installed over and surrounds the majority of the length of the structural shell 14. The shield jacket 28 is formed from a tubular outer skin 58. The internal diameter of the outer skin 58 is greater than the external diameter of the shell 14, thus defining an annular space that is filled with a neutron radiation absorbing shield material 60. One suitable neutron radiation absorbing shield material 60 is a hydrogenous solid neutron absorbing material, such as a cementious castable neutron absorbing material. The upper and lower ends of the shield jacket 28 are closed by upper and lower annular support rings 62 and 63, respectively, welded to the exterior of the structural shell 14 and the edges of the outer skin 58. The lower annular support right 63 includes stainless steel rupture discs which prevent over pressurization of the shield jacket 28.

Figure 6:
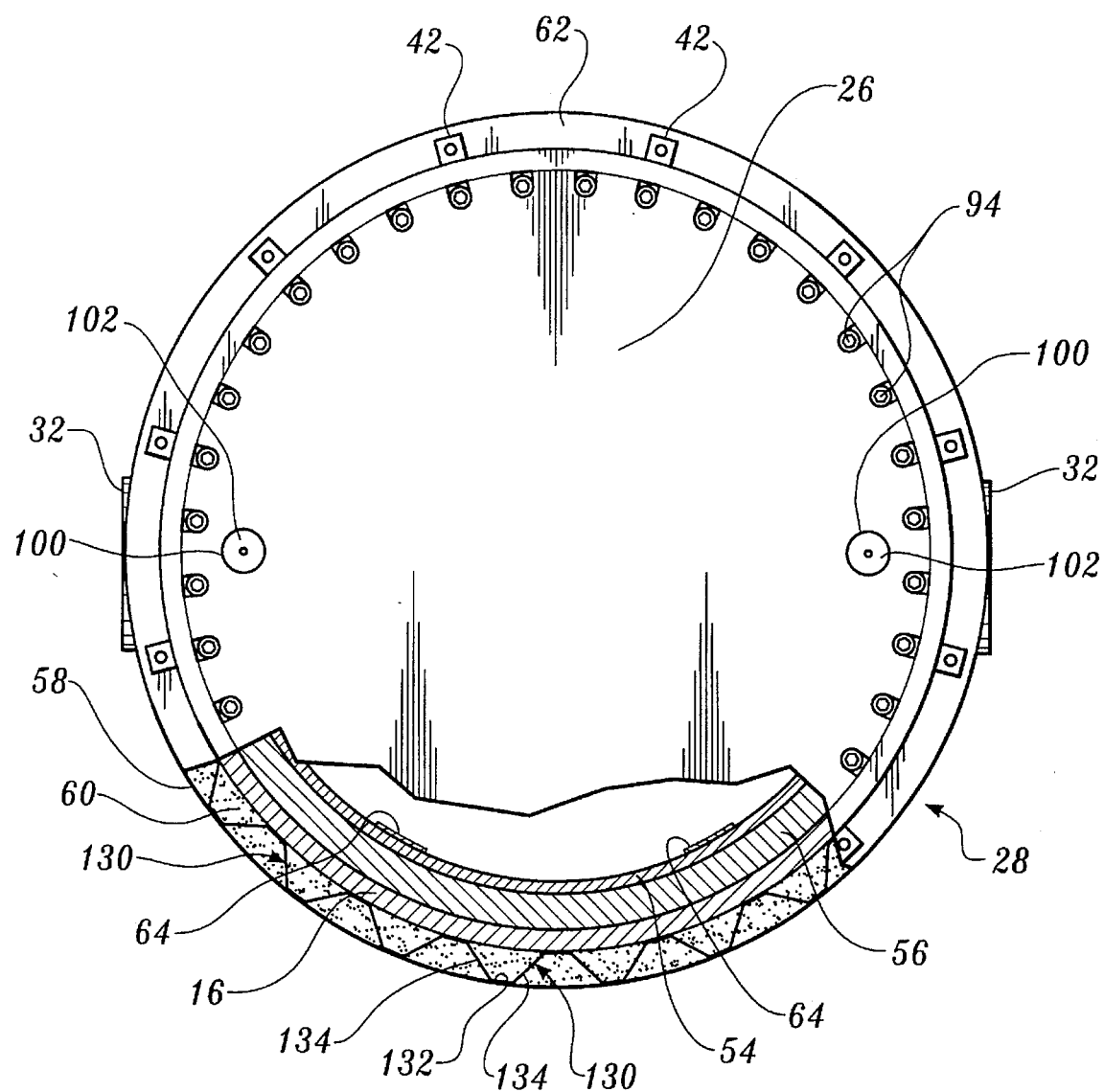
FIG. 6 provides an end view of the cask of FIG. 1 to illustrate the "top" end of the cask, with a partial cross section taken along a plane oriented orthogonally to the longitudinal axis of the cask to show the internal construction of the neutron shield jacket and cask body.

A pair of elongate rails 64 are secured by welding or other means to the interior of the inner shell 54 of the body 12. The rails 64 are oriented parallel to the central longitudinal axis 44 of the cask 10, and extend the length of the inner shell 54. Each rail 64, also shown in FIG. 6, is formed from a strip of flat sheet. The rails 64 are spaced radially apart from each other within the same radial quadrant of the inner shell 54. The rails 64 are positioned on the side of the cask body 12 that rests on the trailer or other support surface when the cask 10 is laid down horizontally Each rail 64 is preferably formed from a material that is harder than the material used to construct the inner shell 54, such as a hardened stainless steel, which provides a non-gouging, low-friction surface for the canister 38 to slide on during installation or removal of the canister 38 from the cask 10. One suitable material is nitronic 60, cold reduced sheet, ASTM A-240, grade UN5, 521800, RC29.35 stainless steel.

The bottom edge 46 of the lower shell portion 18 and the bottom edge of the inner shell 54 are each welded to the bottom closure plate 20, thereby sealing the bottom end of the body 12, as shall be described in more detail subsequently. The top edge 52 of the upper shell portion 16 and the top edge of the inner shell 54 are each welded to an annular sealing ring 66. The top closure plate 26 can be secured to the annular sealing ring 66 to selectively close the top end of the body 12.

Figure 3A:
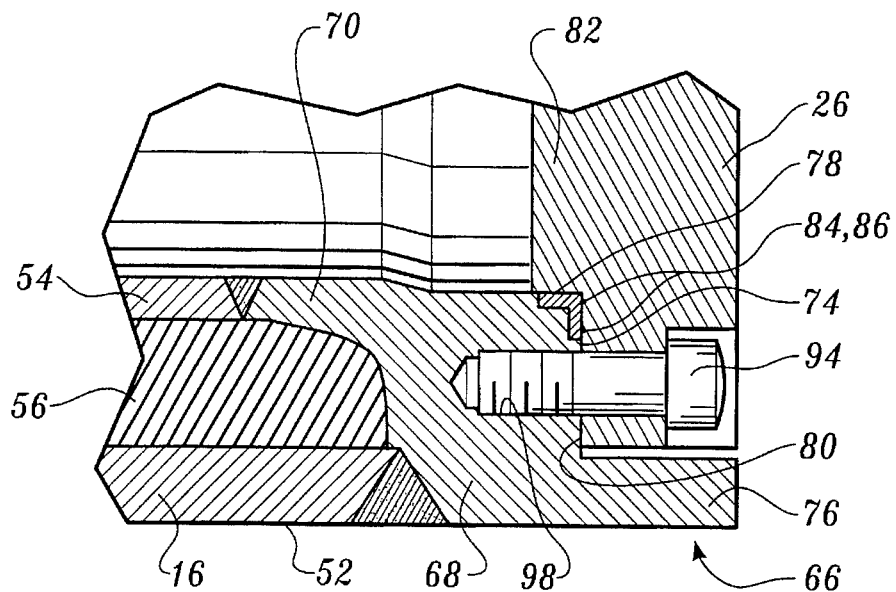
FIG. 3A provides a detailed cross-sectional view of the mated top closure plate and top end of the cask body of FIG. 2, taken along the same plane as in FIG. 2.

Reference will now be had to FIGS. 2 and 3A to describe the configuration of the annular sealing ring 66. The sealing ring 66 has a main body portion having an essentially rectangular cross section. An annular lower flange 70 extends downwardly from the lower surface of the body portion 68 adjacent the inner edge of the ring 66. The lower flange 70 has an internal diameter substantially equal to the internal diameter of the internal shell 54.

The top edge 52 of the upper shell portion 16 is welded to the main body portion 68 of the annular sealing ring 66, while the lower edge of the lower flange 70 is welded to the top edge of the inner shell 54. Both welds are full penetration welds extending around the full circumference of the annular sealing ring 66. The top surface of the body portion 68 defines an annular abutment surface 74. An annular upper flange 76 projects upwardly from the abutment surface 74 along the outer perimeter of the annular sealing ring 66.

A hardened sealing surface is formed on the abutment surface 74 by an annular hardened metal inlay 78. The inlay 78 is preferably formed by weld overlay of a hard metal onto the base metal of the annular sealing ring 66. The annular sealing ring 66 is preferably formed from a machined ring forging of type 304 stainless steel. The inlay 78 is preferably formed of inconel alloy. The inlay 78 wraps the inner upper corner of the body portion 68 of the annular sealing ring 66, so that it provides a hard polished surface on both the inner portion of the abutment surface 74 and the upper portion of the internal diameter of the body portion 68. The hard surface provided by the inlay 78 is highly resistant to permanent deformation upon impact of the joint area of the cask 10.

Referring still to FIGS. 2 and 3A, the top closure plate 26 is configured as a solid disk. The top plate 26 has an annular recess formed about its perimeter in its bottom side that defines an annular sealing surface 80. The annular sealing surface 80 corresponds in dimension substantially to the abutment surface 74 of the annular sealing ring 66. As shown in FIG. 3A, the top closure plate 26 is installed on the body 12 by sliding the top closure plate 26 within the annular upper flange 76 of the annular sealing ring 66. When so installed, the sealing surface 80 of the top closure plate 26 abuts the abutment surface 74 of the annular sealing ring 76. A non-recessed center portion 82 of the bottom side of the top closure plate 26 is received within the inside diameter of the body portion 68 of the annular sealing ring 66.

The inlay 78 provides the sealing surface for the annular sealing ring 66. Two annular grooves 84 are formed in the portion of the sealing surface 80 of the top closure plate 26 that overlies the inlay 78. As shown in FIG. 3A, a seal 86 is received within each of the grooves 84. The seals may be either deformable metal seals, or elastomeric seals, e.g., O-rings, or alternately configured elastomeric seals. The seals 86 are deformed between the top closure plate 26 and the annular sealing ring 66, and retained within the grooves 84.

Figure 3B:
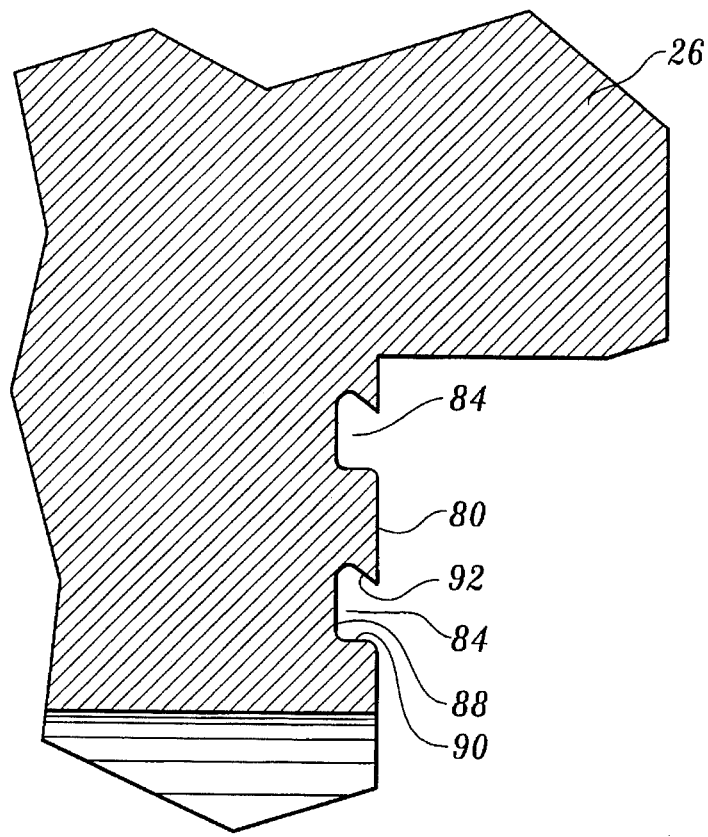
FIG. 3B provides a still further detailed cross-sectional view of the top closure plate sealing surfaces shown in FIG. 3A.

Referring to FIG. 3B, each of the grooves 84 defines a half-dovetail cross-section, having a bottom surface 88, a first orthogonal side surface 90, and a second, inwardly angled side surface 92. The half-dovetail configuration of the grooves 84 ensures that the seals 86 are retained within the grooves 84 when the body 12 is positioned either horizontally or vertically and the top closure plate 26 is removed.

The weld between the annular sealing ring 68 and the inner shell 54 is airtight. The weld between the annular sealing ring 68 and the upper shell portion 16 is also believed to be airtight, but is not tested for that characteristic. Likewise, the seal joint formed by the sealing surface 80, abutment surface 74, and seal 86 is also airtight.

The top closure plate 26 is selectively secured to the annular sealing ring 66 by installing a plurality of bolts 94 through recessed apertures 96 formed at evenly-spaced intervals about the perimeter of the top closure plate 26 into correspondingly located threaded passages 98 formed in the abutment surface 74 of the annular sealing ring 66. Drain holes (not shown) are provided at the base of each threaded passage 98. Referring to FIG. 6, two monitoring ports 100 are formed in the top closure plate and are selectively sealed by plugs 102.

Figure 4:
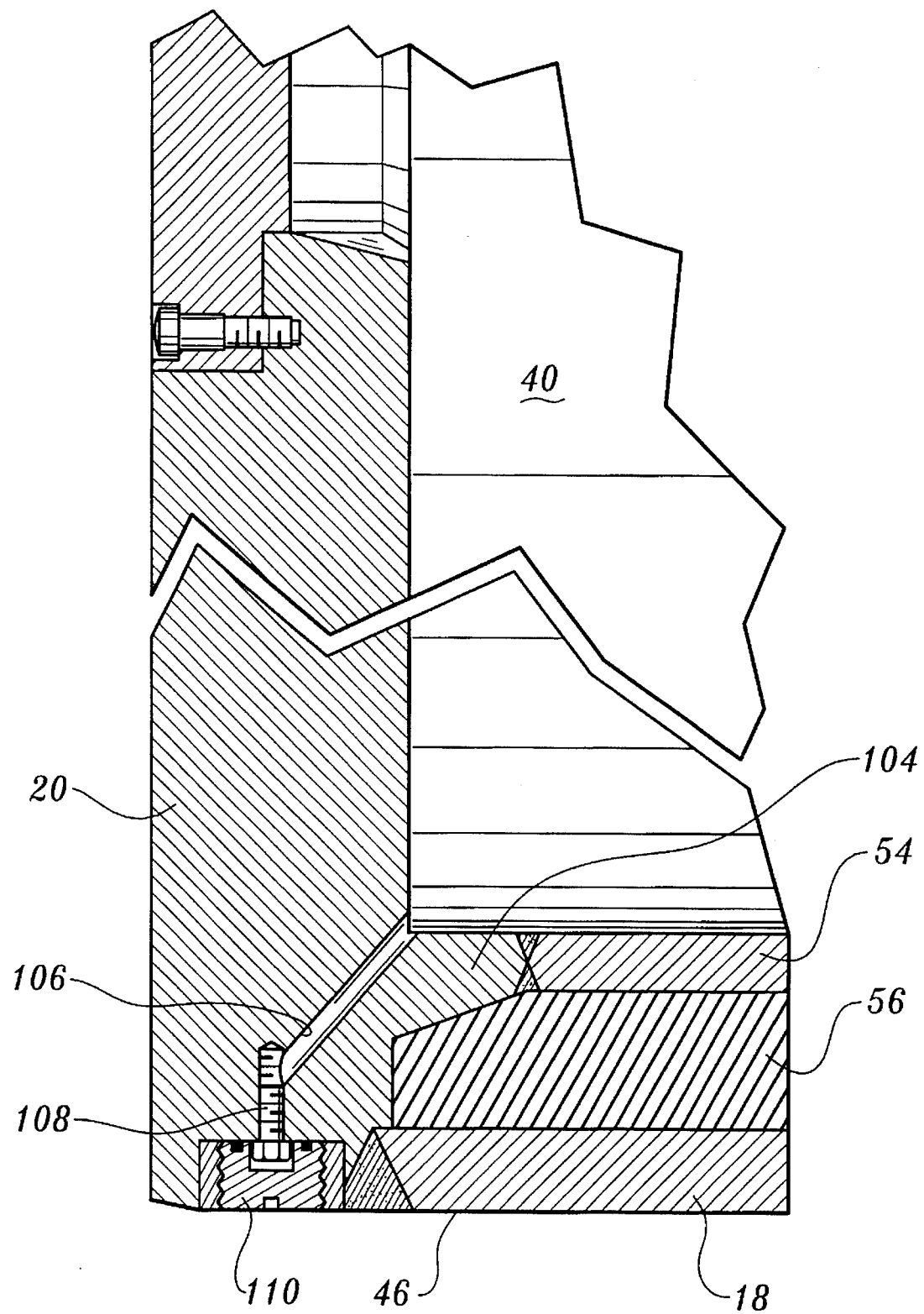
FIG. 4 provides a detailed cross-sectional view of the welded bottom plate closure and assembled access aperture closure plate, taken along the same plane as in FIG. 2.

Attention is now directed to FIGS. 2 and 4 to describe the airtight joints formed between the bottom closure plate 20 and the structural shell 14 and inner shell 54. The bottom shell 20 is also configured as a solid disk. An annular flange 104 projects upwardly from the top (i.e., inner) surface of the bottom closure plate 20, at a location spaced radially inwardly from the outer perimeter of the top closure plate 20. When the bottom closure plate 20 is placed over the bottom end of the body 12, an upper edge of the flange 104 abuts the lower edge of the inner shell 54. The upper edge of the flange 104 is welded to the lower edge of the inner shell 54. The bottom edge 46 of the lower shell portion 18 is welded to the bottom closure plate 20. Both welds are full penetration welds formed about the full circumference of the bottom closure plate 20, and the weld between the inner shell 54 and the flange 104 is airtight. The weld between the lower shell portion 18 and the flange 104 is also believed to be airtight, but is not tested for that characteristic.

A drain port 106 is formed through the bottom closure plate 20, from the top (inner) surface of the plate to the plate's outer circumference, and is sealed with a threaded bolt 108 capped by a threaded plug 110. The threaded bolt 108 and threaded plug 110 each include a seal (not shown) that is leak tight. The port 106 permits drainage of liquids from the interior cavity 40 of the cask 10. The drain port 106 may be located at any orientation on the bottom of the cask.

Figure 5A:
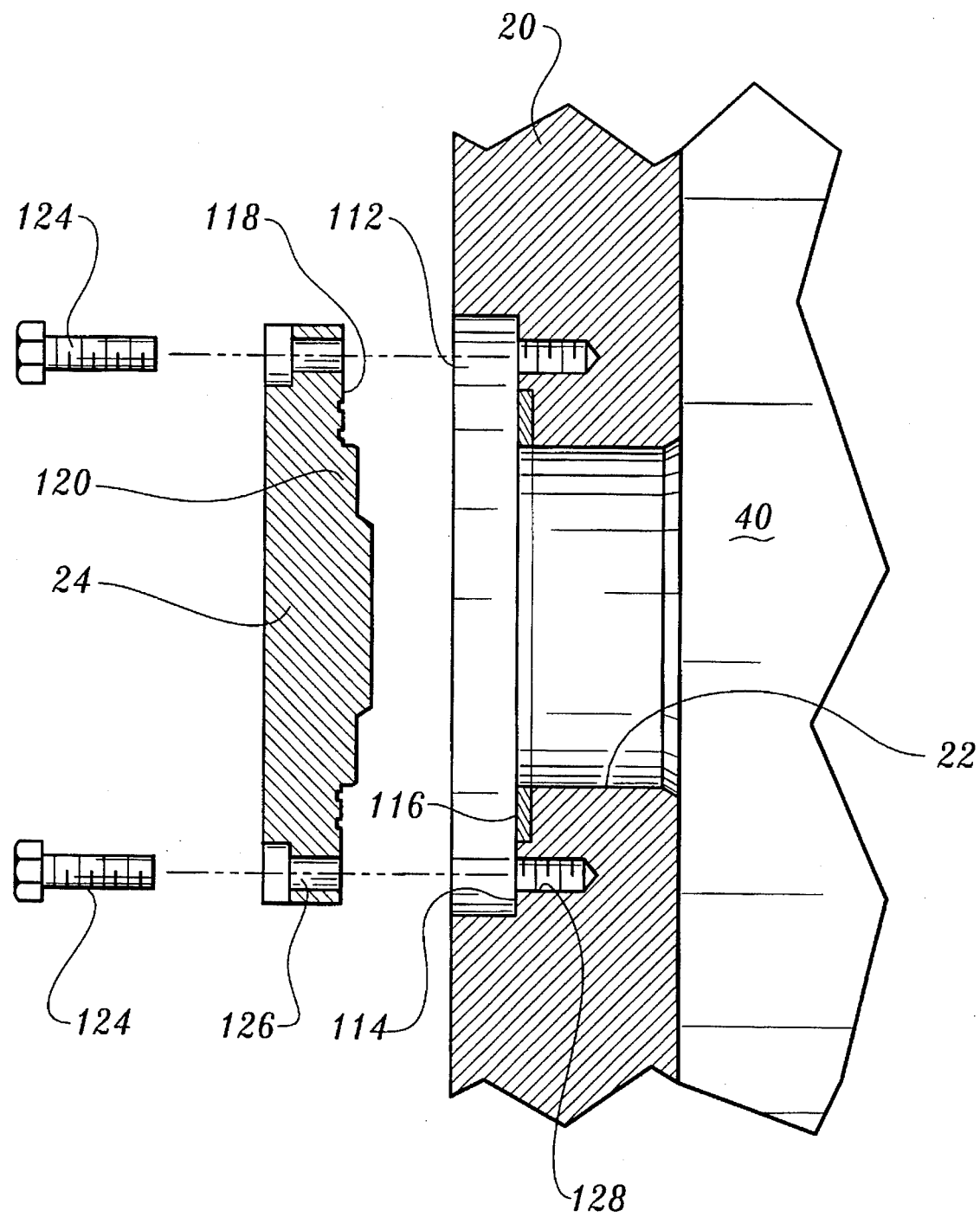
FIG. 5A provides a detailed cross-sectional view of the ram closure plate exploded from mating surfaces of the bottom closure plate, taken along the same plane as in FIG. 2.

Referring to FIGS. 2 and 5A, the central access aperture 22 is formed centrally through the bottom closure plate 20. An annular recess 112 is formed in the bottom (i.e., outer) side of the bottom closure plate 20, effectively enlarging the diameter of the bottom portion of the central access aperture 22. The recess 112 defines an annular abutment surface 114. A hardened inlay 116, which may be formed by weld overlay of a hard metal, such as inconel, is formed angularly around the innermost portion of the abutment surface 114 adjoining the access aperture 22. The inlay 116 is polished to define a sealing surface.

The access cover plate 24 is configured as a solid disk having an outer diameter that is sized to be received within the recess 112. An annular recess is formed in the top (i.e., inner) side of the access cover plate 24 about the plate's perimeter to define a sealing surface 118. A non-recessed center portion 120 is bordered by the sealing surface 118. When the access cover plate 24 is assembled to the bottom closure plate 20, the access cover plate 24 is received within the recess 112 of the bottom closure plate 20, with the center portion 120 of the access plate 24 being received within the central access aperture 22. The sealing surface 118 overlies the inlay 116 in this installed configuration.

Figure 5B:
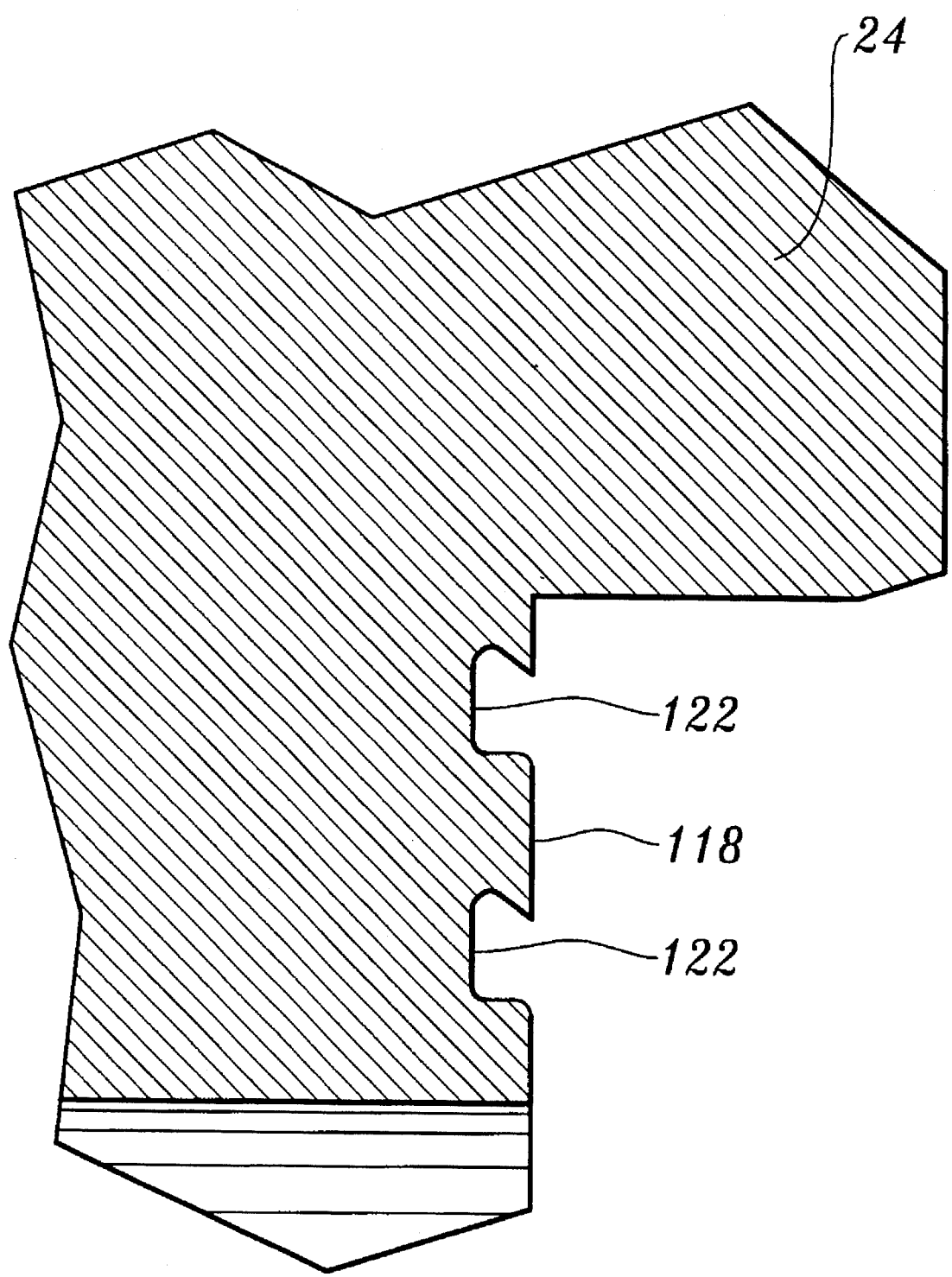
FIG. 5B provides a still further detailed cross-sectional view of the ram closure plate sealing area, as shown in FIG. 5A.

Referring to FIGS. 5A and 5B, two half-dovetailed annular grooves 122, configured similarly to the previously described grooves 84 in the top closure plate 26, are formed in the sealing surface 118. Again, seals (not shown) are received within the grooves 122 and are compressed between the sealing surface 118 and the inlay 116 to form an airtight seal between the ram closure plate 24 and the bottom closure plate 20. The ram closure plate 24 is retained in place by a plurality of bolts 124 inserted through recessed apertures 126 formed at spaced intervals about the periphery of the access cover plate 24 and received within threaded passages 128 formed at corresponding locations in the abutment surface 114 of the bottom closure plate 20.

The bottom closure plate 20 is preferably formed from a machine forging, such as a type 304 stainless steel forging. The ram closure plate is preferably formed from a higher strength material, such as type XM-19 stainless steel.

Referring to FIG. 6, the construction of the shield jacket 28 will now be described in greater detail. As noted previously, the outer skin 58 of the shield jacket 28 is larger than the external diameter of the upper shell portion 16 and lower shell portion 18. The annular space created therebetween is filled with neutron radiation absorbing shield material 60. Neutron radiation shielding material 60 is not a strong load bearing material, and thus a plurality of elongate reinforcing members 130 are embedded within the shield material 60. The elongate reinforcing members 130 are oriented so as to be parallel to the central axis 44 of the cask body 12.

Figure 8:
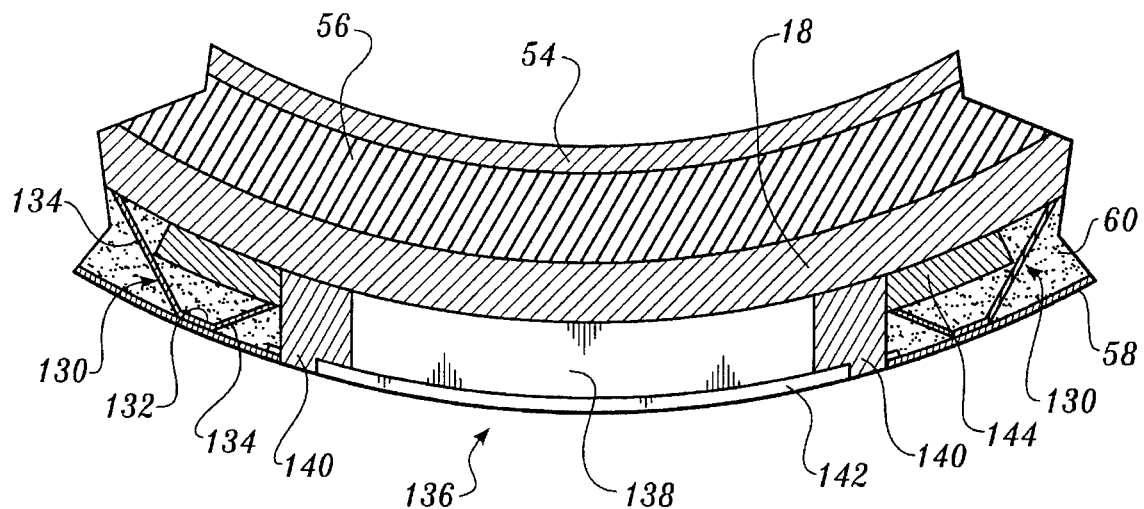
FIG. 8 shows a detailed cross-sectional view of the shear key way structure of the cask of FIG. 1, taken along a plane oriented orthogonally to the longitudinal axis of the cask.
Figure 9:
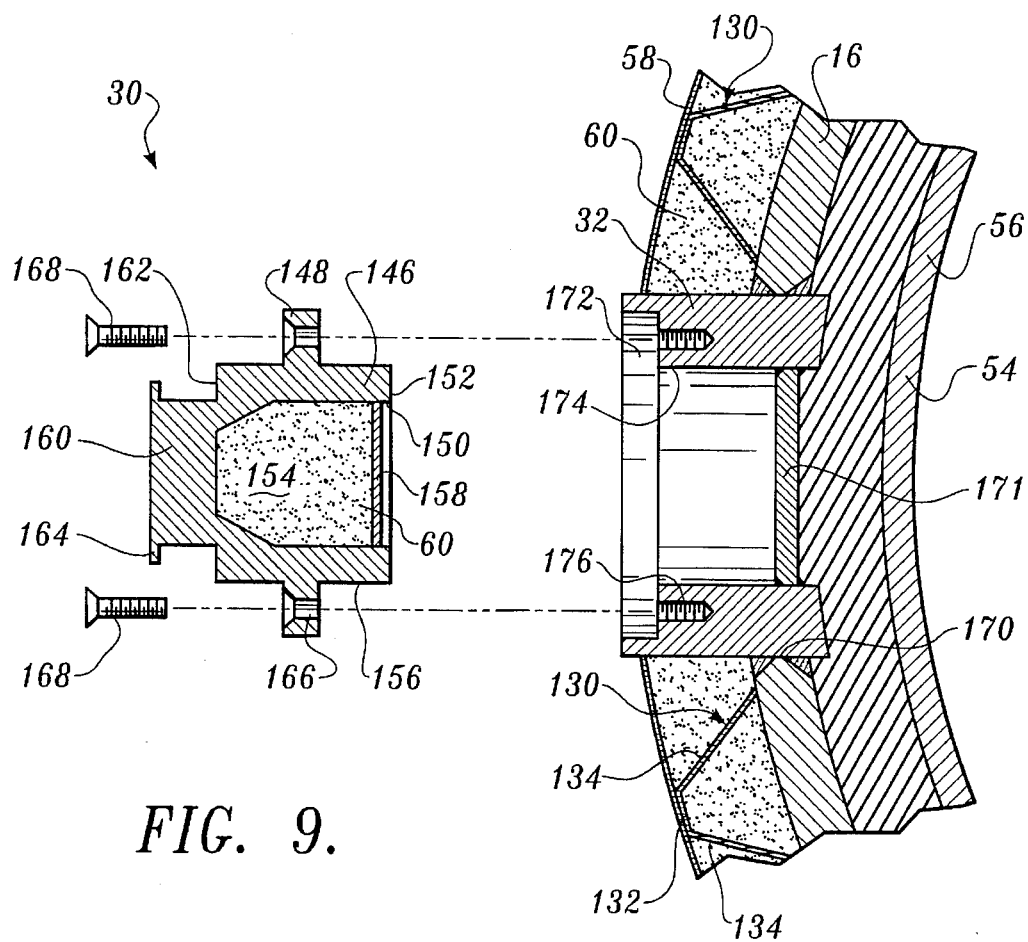
FIG. 9 provides a detailed exploded view of the upper trunnion and trunnion mounting sleeve of the cask of FIG. 1, taken along a plane oriented orthogonally to the longitudinal axis of the cask and aligned with the central axis of the upper trunnion.

Each reinforcing member 130, which are also illustrated in FIGS. 8 and 9, is bent centrally along its length on two fold lines, such that each member 130 defines a flattened V-shaped cross section. Each member 130 thus has an elongate center portion 132 and first and second elongate leg portions 134 that project angularly outwardly from the center portion 132. The center portion 132 of each member 130 is welded to the interior of the outer skin 58 of the shield jacket 28. The projecting edges of each of the two leg portions 134 contacts and is welded to the outside of the structural shell 14. This gives a "corrugated" reinforcing effect to the structure of the shield jacket 28. The reinforcing members 130 transfer heat from the structural shell 14 through the shield jacket 28 to the exterior of the cask 10 to remove the decay heat of spent fuel contained within the cask 10, and also provide an integral structural system for supporting the cask during transport.

Figure 7:
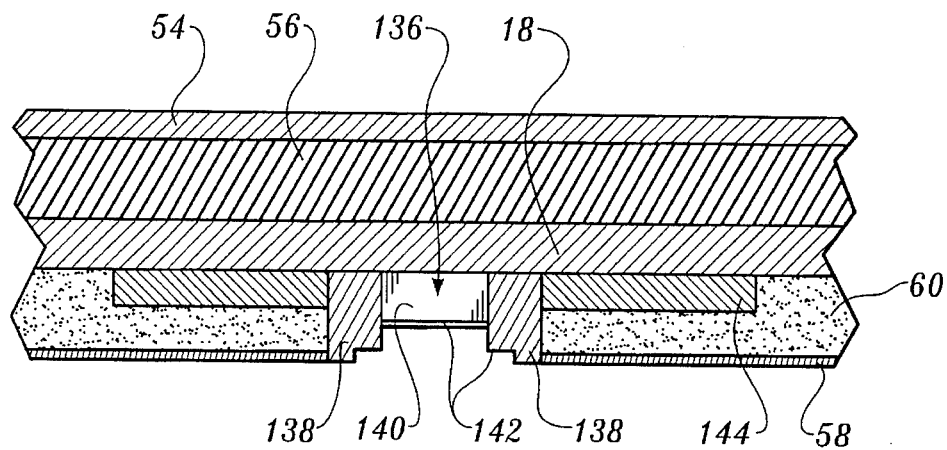
FIG. 7 provides a detailed cross-sectional view of the shear key way structure of the cask of FIG. 1, taken along the same plane as in FIG. 2.

Reference is now had to FIGS. 1, 7, and 8 to describe an additional feature of the cask 10. The cask 10 includes a tie-down key way structure 136. The key way structure 136 serves as an anchor point for a tie-down that secures the cask 10 to a transport skid for secure transportation. The key way structure 136 defines an elongate arcuate opening formed through the shield jacket 28 approximately mid-length of the body 12. The key way structure 136 has a radially oriented length and an axially oriented width, and is formed from four frame members that are welded directly to the structural shell 14.

Referring now to FIGS. 7 and 8, the long sides of the key way structure 136 are formed by arcuate bearing blocks 138 that are mounted arcuately in spaced-apart disposition on the lower shell portion 18. The perimeter frame of the key way structure 136 is completed by two longitudinally oriented tie-bar members 140 welded across the opposing ends of the bearing blocks 138. Each of the bearing blocks 138 and tie-bars 140 is welded to the lower shell portion 18, and cooperatively define a rectangular frame. A recess 142 is formed in the outer surface of each of the bearing blocks 138 and tie-bars 140 about the inner perimeter of the frame defined thereby.

The perimeter frame defined by the bearing blocks 138 and tie-bars 140 are further reinforced by an arcuate pad plate 144 that fits over the bearing blocks 138 and tie-bars 140. The pad plate 144 is disposed within the interior of the shield jacket 28 and is welded directly to the lower shell portion 18, as well as to the bearing blocks 138 and tie bars 140. The outer skin 58 of the shield jacket 28 is also welded to the tie bars 140 and bearing blocks 138.

The pad plate 144, tie bars 140, and bearing blocks 138 are preferably formed from a high-strength metal, such as type XM-19 stainless, due to the stress imposed on them during use. Because it is desired that the key way structure 136 be sacrificed rather than the integrity of the structural shell 14 in the event of excessive loads applied to the key way structure 136, the welds between the key way structure 136 and the lower shell portion 18 and outer skin 58 of the shield jacket 28 are relatively small. This ensures that the key way structure 136 will give way prior to breakage of the structural shell 14 in the event of extreme loads on the key way structure 136.

The construction of the upper trunnions 30 and lower trunnions 34 will now be described with reference to FIGS. 9 and 10, respectively. The upper trunnions 30 and lower trunnions 34 are similarly constructed except as noted. Thus, only the upper trunnion 30 will be described with it being understood that the same description applies to the lower trunnion 34. The upper trunnion 30 has a cylindrical body 146. An annular flange 148 is formed about the midsection of the body 146. A recess 150 is formed in one of the circular faces 152 of the body 146, and extends fully into the interior of the body 146 to define a cavity 154. The body 146 thus has a hollow configuration. The portion of the trunnion body 146 between the flange 148 and the first face 152 defines a cylindrical base 156.

The interior cavity 154 is filled with neutron radiation absorbing shield material 60. The neutron shield material 60 is capped and retained by a circular back plate 158 that is received within the recess 150 and welded in position. The presence of the neutron shield material 60 reduces streaming of neutrons through the upper trunnions 30.

A cylindrical bearing projection 160 projects from the second circular face 162 of the trunnion body 146. An annular flange 164 is formed about the end of the bearing projection 160. The bearing projection 160, flange 164, and second circular face 162 cooperatively define a beating groove that can be grasped by a correspondingly contoured hook for transport of the cask 10. A plurality of apertures 166 are formed through the flange 48 at spaced intervals about the perimeter of the upper trunnion 30, for purposes of securement to the cask 10 by bolts 168.

The lower trunnions 34 are configured similarly to the upper trunnions 30, except that no cylindrical beating projection 160 projects from the trunnion body 146. Additionally, the interior cavity 154 is not filled with a neutron shield material, and back plate 158 is also not included.

The upper trunnion 30 can be selectively and releasably secured to the cask body 12 by engagement with the upper trunnion mounting sleeve 32. The upper trunnion mounting sleeve 32 consists of a tubular sleeve that projects through and is welded to the upper shell portion 16. A circular aperture 170 is formed through the upper shell portion 16 at the desired location for the upper trunnion mounting sleeve 32. A similarly oriented aperture is formed through the outer skin 58 of the shield jacket 28. The upper trunnion mounting sleeve 32 is installed through the shield jacket 28 and the upper shell portion 16 such that the central axis (not shown) of the upper trunnion mounting sleeve 32 is oriented radially relative to the longitudinal axis 44 of the cask body 12.

The upper trunnion mounting sleeve 32 is welded fully about its perimeter to the upper shell portion 16. Additionally, a weld is formed between the outer skin 58 of the shield jacket 28 and the upper trunnion mounting sleeve 30. A circular trunnion filler plate 171 is installed within the upper trunnion mounting sleeve 32, and positioned within the radially inward end of the trunnion mounting sleeve 30 so as to be in line with the arc of the upper shell portion 16. The trunnion filler plate 170 is welded to the interior of the upper trunnion mounting sleeve 32 to seal the radially interior end of the upper trunnion mounting sleeve 32.

An annular recess 172 is formed about the entry to the upper trunnion mounting sleeve 32. To secure the upper trunnion 30 in position on the cask 10, the circular base 156 of the upper trunnion 30 is slidably received within the interior passage 174 defined by the upper trunnion mounting sleeve 32, and the flange 148 of the upper trunnion 30 is received within the recess 172. The dimensional tolerances of the interior passage 174 of the upper trunnion mounting sleeve 30 and the recess 172, as well as the base 156 and flange 148 of the upper trunnion 30, are closely controlled such that a very close slip fit is formed between the upper trunnion 30 and the upper trunnion mounting sleeve 32. This ensures that the upper trunnion 30 cannot become cocked within the upper trunnion mounting sleeve 32.

The bolts 168 are installed through the apertures 166 and the flange 148 of the upper trunnion 30 and into correspondingly arranged threaded passages 176 formed into the recess 172 of the upper trunnion mounting sleeve 32.

Because of this two-piece mounting of the upper trunnion 30, utilizing the separate upper trunnion 30 and upper trunnion mounting sleeve 32, the upper trunnion 30 can be removed as desired when hoisting of the cask 10 is not required. Additionally, because the upper trunnion mounting sleeve 32 receives and captures the upper trunnion 30, the bolts 168 are substantially isolated from shear and tensile loads, which instead are transmitted from the upper trunnion 30 to the upper trunnion mounting sleeve 32 and then to the structural shell 14. This construction helps to ensure that the upper trunnions 30 are not torn off of the structural shell 14 when the upper trunnions 30 are grasped to hoist the weight of the cask 10 and the contents therein.

The upper trunnion mounting sleeve 32 and upper trunnion 30 are preferably formed from a high strength metal, such as type XM-19 stainless steel. The trunnion backing plate 158 can be formed from type 304 stainless steel or other suitable metals.

Figure 10:
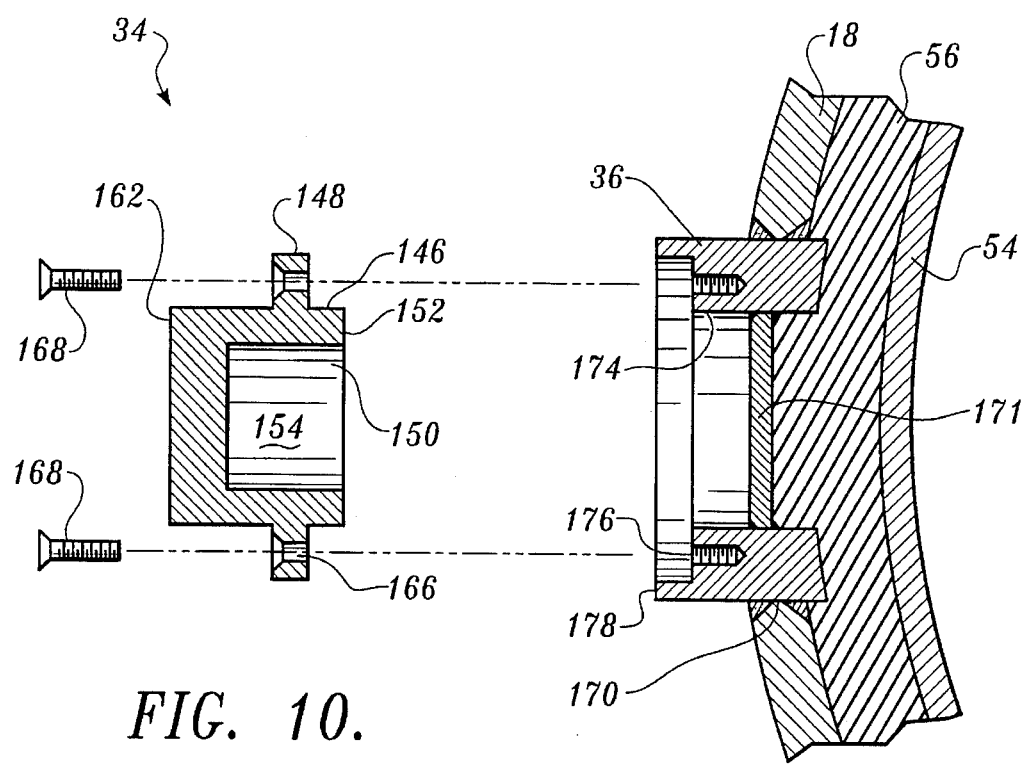
FIG. 10 provides a detailed exploded view of the lower trunnion and trunnion mounting sleeve of the cask of FIG. 1, taken along a plane oriented orthogonally to the longitudinal axis of the cask and aligned with the central axis of the bottom trunnion.

Referring to FIG. 10, the lower trunnion mounting sleeve 36 is identically constructed and secured to the lower shell portion 18, as was the upper trunnion sleeve 32 constructed and secured to the upper shell portion 16, except as noted herein. Because the stresses imposed on the lower trunnions 34 are not as great as those imposed on the upper trunnions 30, a recess 172 is not formed in the outer face of the lower trunnion mounting sleeve 36 to receive the flange 148 of the lower trunnion 34. Instead, the axial length of the lower trunnion mounting sleeve 36 is correspondingly reduced, and the flange 148 of the lower trunnion 34 abuts the annular exterior face 178 of the lower trunnion mounting sleeve 36.

Figure 11A:
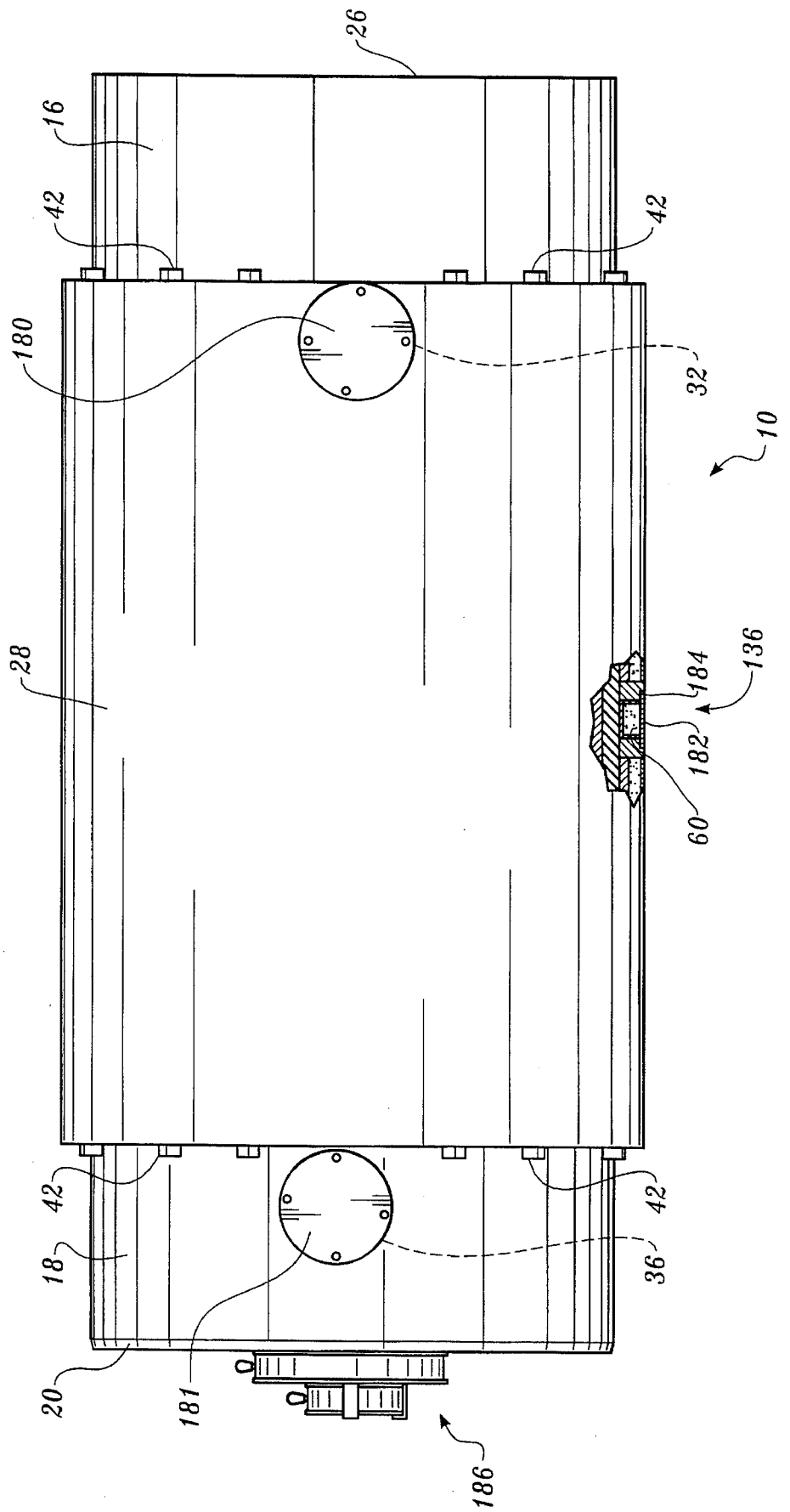
FIG. 11A provides an elevation view of the cask of FIG. 1, to illustrate the long side of the cask, with shield plugs installed to cover the trunnion mounting sleeves and the access aperture port, and with the shear key way structure being shown in cross section to illustrate placement of the key way shield plug.

Referring now to FIG. 11A, often when the cask 10 has been loaded with a canister 38, the cask 10 will be temporarily stationary on-site. During such times, it is not required to mount the upper trunnions 30 and lower trunnions 34 on the cask 10. In such instances, it is desired to further reduce neutron streaming past the trunnions 30 and gamma streaming past trunnions 34 by removing the trunnions 30 and 34, and capping the upper trunnion mounting sleeves 32 with trunnion shields 180 trunnion mounting sleeves 36 with trunnion shields 181. Trunnion shields 180 are metal disks that are filled with neutron shield material 60 (not shown) and bolted to the upper trunnion mounting sleeves 32. Trunnion shields 180 are solid metal disks bolted to the upper trunnion mounting sleeves.

Additionally, when not in transport, the key way structure 136 is not being utilized. At such times, it is desirable to mount a key way shield 182 (also shown in FIG. 1) to cover the key way structure 136. The key way shield 182 is again filled with a neutron shield material 60 and is secured by bolting a top plate 184 to the frame of the key way structure 136. This again is to reduce neutron streaming through the key way structure 136.

Finally, during unloading of the canister 38 from the cask 10, it is necessary to remove the access cover plate 24 from the bottom closure plate 20, as shall be described briefly below. During such times when the access cover plate 24 is removed from the cask 10 and it is not actually necessary to insert a ram, as shall be described, through the central access aperture 22, an access aperture shield assembly 186 is secured centrally to the bottom closure plate 20 to cover the access aperture 22.

Figure 11B:
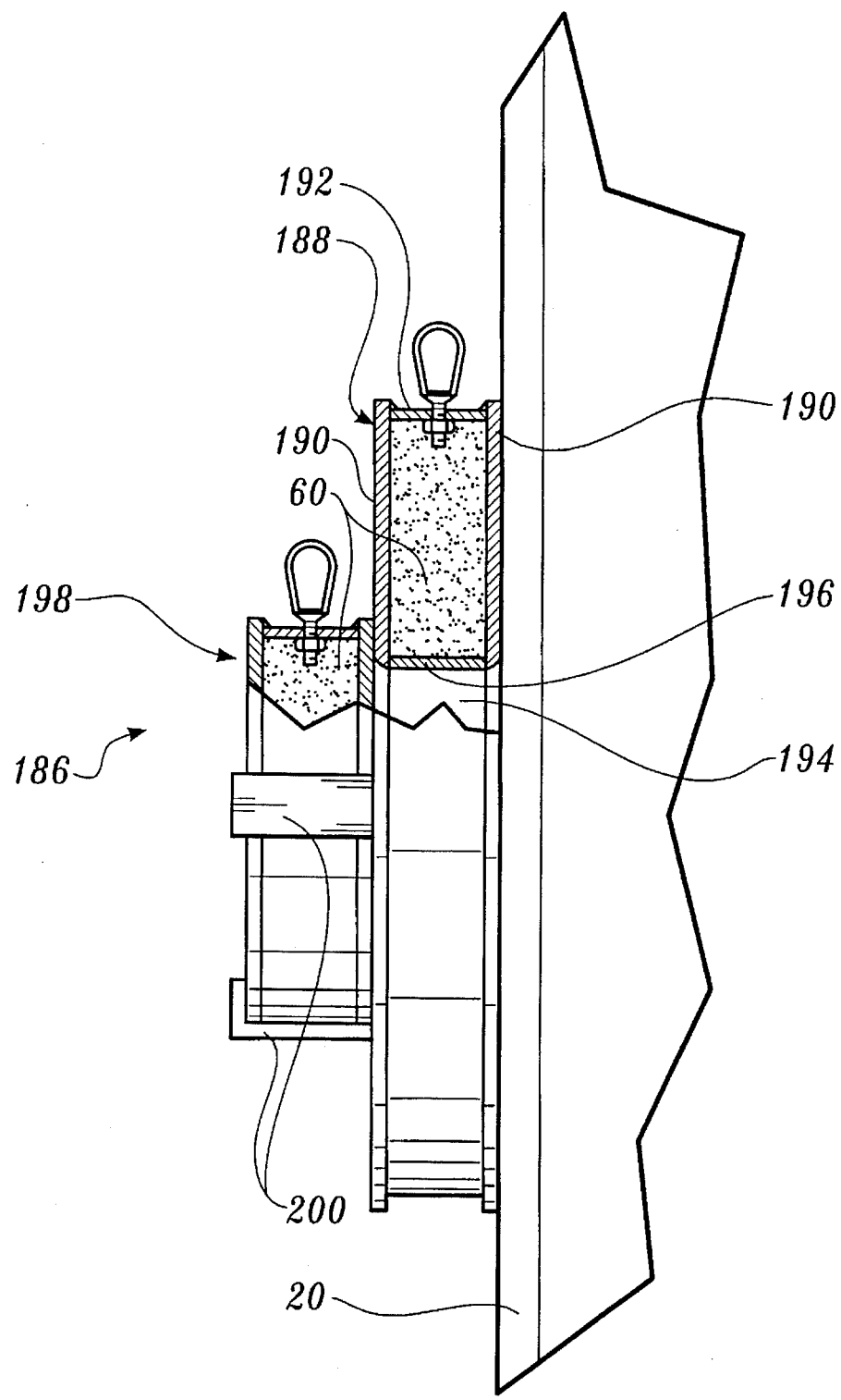
FIG. 11B provides a detailed side elevation view of the access aperture shield plug assembly, shown in partial cross section taken along a plane aligned with the longitudinal axis of the cask.

Referring to FIG. 11B, the access aperture shield assembly 186 consists of an annular first shield member 188 that is formed from two annular plates 190 that are secured together by an annular ring 192. An aperture 194 is formed centrally through the plates 190, and an internal ring 196 borders this aperture 194. The interior of the first shield member 188 is filled with a neutron absorbing shield material 60. A second similarly constructed shield member 198 is also utilized. Shield member 198 is also formed as a disk, but is a smaller diameter than shield member 188, and includes no central aperture. It also is filled with neutron absorbing shield material 60. Shield member 198 is supported by a plurality of hangers 200, extending outwardly from the first shield member 188 around aperture 194 in the shield member 188. When both the shield member 198 and shield member 188 are utilized, the complete area of the central access aperture 22 is shielded.

Figure 13:
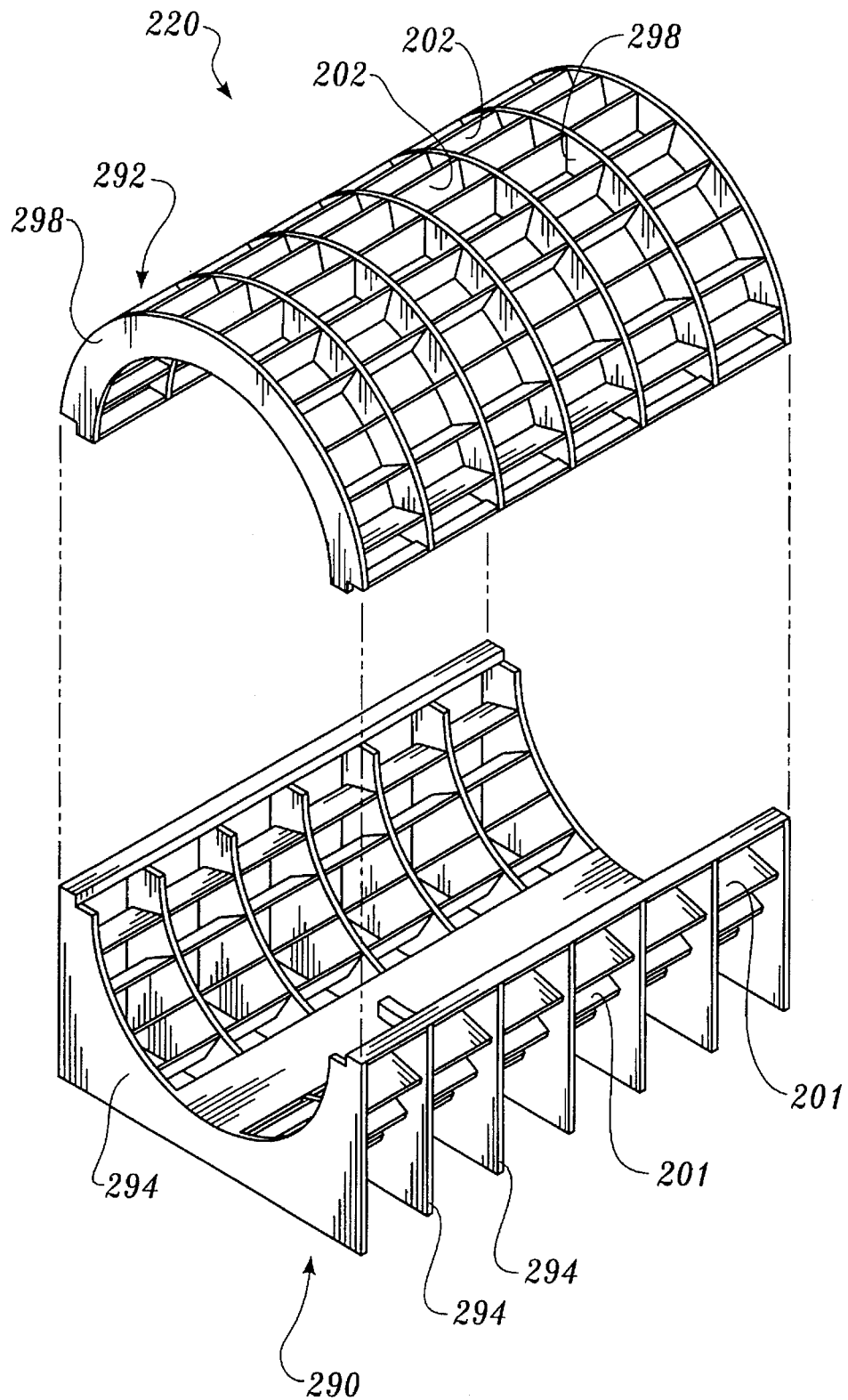
FIG. 13 is a perspective view of the skid in FIG. 12.
Figure 14:
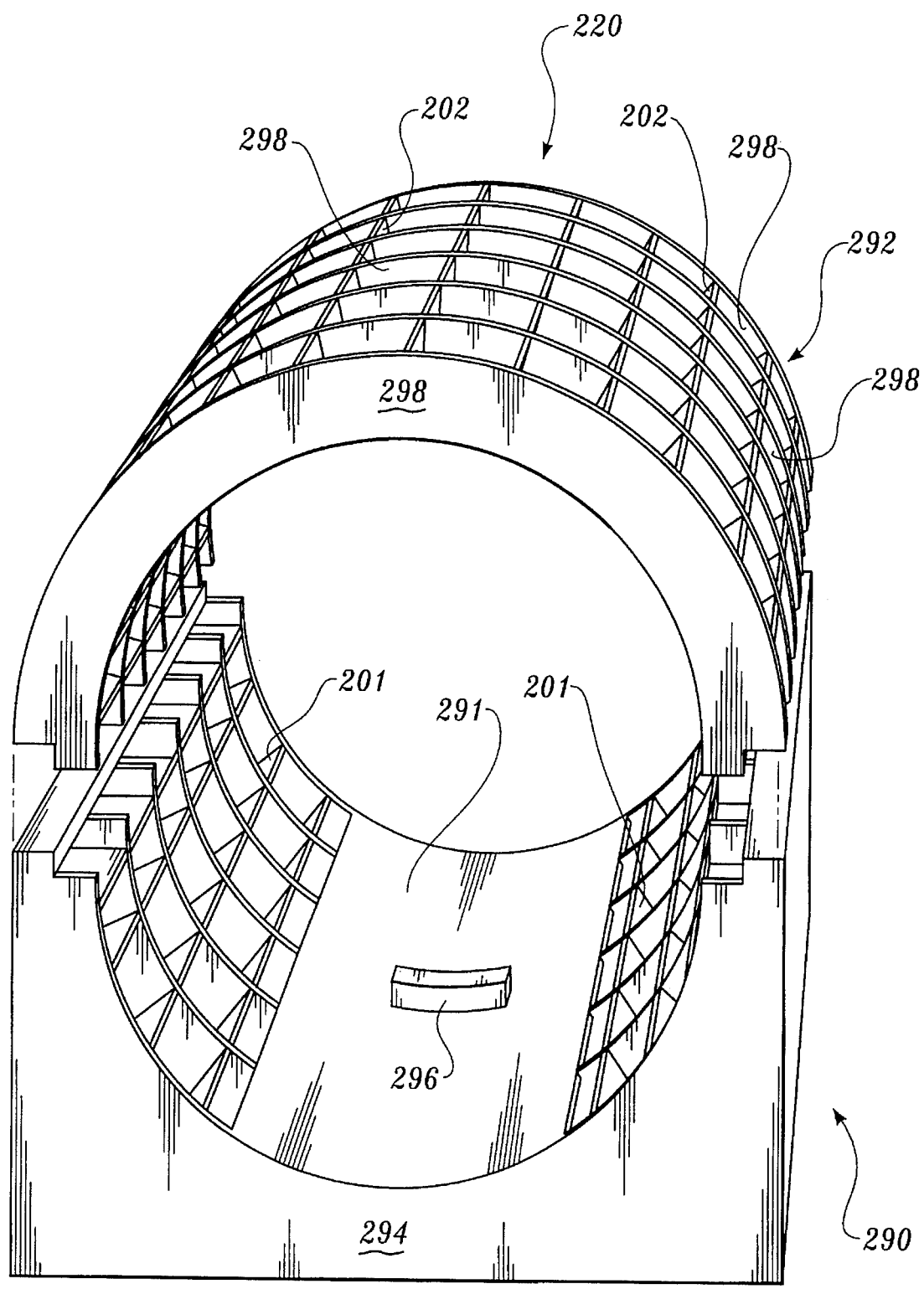
FIG. 14 is a front view of the skid in FIG. 12.

Referring to FIGS. 12, 13 and 14, in another aspect, the present invention relates to a skid for supporting and protecting the transportation cask for spent nuclear fuel during transportation. FIG. 12 illustrates a conventional trailer 226 that includes a transportation cask enclosed by skid 220 formed in accordance with the present invention and a pair of impact limiters 222 formed in accordance with the invention described in the application entitled Impact Limiter For Spent Nuclear Fuel Transportation Cask. In FIG. 12, the transportation cask is not visible, as it is completely encased by skid 220 and impact limiters 222. Skid 220 is further enclosed by a curtain of expanded metal 224, which further obscures skid 220 and the transportation cask. The curtain of expanded metal 224 is provided around skid 220 in order to shield skid 220 and the transportation cask from sunlight. In FIG. 12, the longitudinal axis of the transportation cask is parallel to the length of trailer 226. Impact limiters 222 are positioned on opposite ends of the generally cylindrical transportation cask. Skid 220 supports the transportation cask along its length between impact limiters 222, as described below in more detail.

Referring primarily to FIGS. 13 and 14, transportation skid 220 comprises a lower supporting member 290 and an upper retaining member 292. Lower supporting member 290 carries the vertical and lateral cask loads and includes a plurality of parallel spaced-apart plates 294 lying perpendicular to the longitudinal axis of the transportation cask. Plates 294 include an outer peripheral portion that is substantially square and in use rests on the bed of a transportation trailer. The inner periphery of plates 294 includes a trough which in the illustrated embodiment is semi-circular and mates with a portion of the exterior surface of the transportation cask. At the bottom of the trough in supporting member 290 is a saddle 291 that comprises a plate extending lengthwise along the bottom of the trough and widthwise up the sides of the trough. In the illustrated embodiment, saddle 291 occupies approximately one-third of the bottom radius of the trough. At the bottom of the trough centrally located along the length of saddle 291 is an upward protruding rectangular block 296 that serves as a shear key for mating with tie-down keyway structure (136 in FIG. 1) on the transportation cask. Block 296 cooperates with the transportation cask in order to provide an independent means for carrying axial shear loads for the cask. Spaced-apart plates 294 of lower supporting member 290 are connected by a plurality of longitudinal fins 201 running parallel to the longitudinal axis of the transportation cask. In the illustrated embodiment, plates 294 are made from one-inch steel plates and fins 201 comprised of one-half-inch thick steel plates. Plates 294 provide support for the transportation cask for downward, vertical and transverse loads from the cask.

Upper retaining member 292 carries vertical upward loads for the cask and includes a plurality of spaced-apart plates 298 lying perpendicular to the longitudinal axis of the transportation cask. In the illustrated embodiment, the inner periphery of plates 298 includes an inverted semi-circular trough that is a mirror image of the trough in supporting member 290. The outer periphery of plates 298 is substantially concentric with its inner periphery. Upper retaining member 292 also includes a plurality of parallel longitudinal fins 202 that are positioned parallel to the longitudinal axis of the transportation cask. In the illustrated embodiment, plates 298 and fins 202 are made from metal, such as aluminum. Upper retaining member 292 and lower supporting member 290 mate with each other to define a cylindrical cavity which completely encases the neutron shielding material (60 in FIG. 2).

As described above, the neutron radiation Shielding material is not a strong load-bearing material, and accordingly, a plurality of elongate reinforcing members (130 in FIG. 6) are embedded within the shield material. The elongate reinforcing members are oriented so as to be parallel to the central axis of the cask body. The radial spacing between fins 201 and fins 202 is such that when the transportation cask is mated with rectangular block 296, the center portions 132 of the elongate reinforcing members 130 in the neutron radiation shielding material are aligned and rest along longitudinal fins 201 and 202. Accordingly, the neutron shielding material does not carry the load of the cask, but rather the elongate reinforcing members resting on the longitudinal fins serves to carry the load of the cask.

Utilization of the cask 10 shall now be briefly described. When it is desired to install a canister 38 into the cask 10, the access cover plate 24 is secured to the bottom closure plate 20, while the top closure plate 26 is removed from the cask body 12. The canister 38 is installed into the interior cavity 40 of the cask body 12. These operations are performed inside pools or otherwise in accordance with industry practice. Transport of the open cask during this time is made by grasping the upper trunnions 30 to hoist the cask 10. After water is drained from the interior of the cask 10, and the cask 10 is dried in accordance with standard industry practice, the top closure plate 26 is secured to the cask body 12.

The cask 10 is now hoisted by again hooking the upper trunnions 30 to move the cask 10 to a transport trailer. While being hoisted, the cask 10 is oriented vertically with the weight of the cask being supported by the upper trunnions 30. The cask 10 is then repositioned horizontally on a trailer, during which operation the lower trunnions 34 are utilized to stabilize and reposition the cask 10. The cask 10 can then be transported to the site where the canister 38 is to be installed in a horizontal storage module or other storage module.

Once the cask 10 has arrived at the storage site, the top closure plate 26 is removed and the top end of the open cask body 12 is docked with the intended storage module. The access cover plate 24 can then be removed, and replaced with the access aperture shield assembly 186 to reduce neutron streaming. When it is time to transfer the canister 38 from the cask 10 to the storage module, the second shield member 198 is removed from the access aperture shield assembly 186. A ram can then be inserted through the remaining shield member 198 and the access aperture 22 into the interior cavity 40 of the cask body 12. The ram then pushes the canister 38, which slides on the rails 64 as it moves through the open end of the cask body 12, defined by the annular sealing ring 66. The canister 38 thus moves into the storage module. Once transfer of the canister 38 is completed, the cask 10 can be reassemble and reutilized.

For transportation, the reverse operations to those described above are performed to retrieve the canister into the cask. The cask in then lifted from the trailer and placed on a suitable transportation skid, such as described above, with a shear key which engages the keyway structure 136. The trunnions 30 and 34 are removed and trunnion shields 180 and 181 are installed.

While the present invention has been described above in terms of a preferred embodiment, it should be readily apparent to those of ordinary skill in the art that various alterations, modifications and substitutions may be made within the scope of the present invention. For example, materials other than these described can be utilized to form the components of the cask 10, provided that they meet the parameters set forth herein. It is thus intended that the scope of letters patent granted hereon be limited only by the definitions contained in the appended claims.

The embodiments of the invention in which an exclusive property or privilege is claimed are defined as follows:

1. A container for containing and transporting spent nuclear fuel, comprising:

a tubular inner shell defining a cavity for receiving spent nuclear fuel and first and second ends;

a tubular outer shell having first and second ends, the outer shell being assembled coaxially over the inner shell to define an annular space therebetween;

a radiation absorbing material filling the annular space;

an annular member defining a central aperture and a first annular sealing surface, wherein the first annular sealing surface defined by the annular member comprises a hardened metal inlay, the annular member being secured proximate its perimeter to the first ends of the inner shell and the outer shell to create an airtight joint with at least one of the inner shell and the outer shell;

a first closure plate releasably securable to the annular member and defining a second annular sealing surface corresponding to the first annular sealing surface defined by the annular member;

a seal positionable between the second annular sealing surface of the first closure plate and the first annular sealing surface of the annular member to create an airtight seal between the first closure plate and the annular member; and a second closure plate secured proximate its perimeter to the second ends of the inner shell and the outer shell to create airtight joints with both the inner shell and the outer shell.

2. The container of claim 1, wherein the hardened metal inlay is formed by depositing a welded overlay.

3. The container of claim 2, wherein the welded overlay comprises an inconel 625 weld overlay.

4. The container of claim 3, wherein the seal is selected from the group consisting of metal seals and elastomeric seals.

* * * * *